US012769889B2

(12) United States Patent
Paulraj et al.

(10) Patent No.: US 12,769,889 B2
(45) Date of Patent: Oct. 20, 2026

(54) MANAGING NON-STANDARD CHANNEL CARDS OF DATA PROCESSING SYSTEMS

(71) Applicant: Dell Products L.P., Round Rock, TX (US)

(72) Inventors: Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 18/785,238

(22) Filed: Jul. 26, 2024

(65) Prior Publication Data

US 2026/0030388 A1 Jan. 29, 2026

(51) Int. Cl.
*G06F 21/72* (2013.01)
*G06F 21/57* (2013.01)
*H04L 9/32* (2006.01)

(52) U.S. Cl.
CPC .............. *G06F 21/72* (2013.01); *G06F 21/57* (2013.01); *H04L 9/3263* (2013.01)

(58) Field of Classification Search
CPC ......... G06F 21/72; G06F 21/57; H04L 9/3263
See application file for complete search history.

(56) References Cited

U.S. PATENT DOCUMENTS 6,976,087 B1 12/2005 Westfall
7,024,593 B1 4/2006 Budd
7,089,335 B2 8/2006 Aiken
7,555,421 B1 6/2009 Beckett
7,974,286 B2 7/2011 Keohane et al.
8,633,801 B2 1/2014 Iwai
8,826,307 B2 9/2014 Nagampalli
(Continued)

FOREIGN PATENT DOCUMENTS

EP 3699851 A1 8/2020

OTHER PUBLICATIONS

Integrated Dell Remote Access Controller 9 User's Guide Published Dec. 2021 (368 pages).
(Continued)

*Primary Examiner* — Amir Mehrmanesh
*Assistant Examiner* — Aayush Aryal
(74) *Attorney, Agent, or Firm* — WOMBLE BOND DICKINSON (US) LLP

(57) ABSTRACT

Methods and systems for managing operation of a data processing system are disclosed. Channel cards of the data processing system may be non-standard channel cards that perform non-standard functions. If a channel card is a non-standard channel card, it may be determined whether to convert the non-standard channel card to a standard channel card. To do so, user input may be obtained from a user of the data processing system. If the non-standard channel card is to be converted to the standard channel card, a certificate for firmware for the standard channel card may be obtained. Using the certificate, firmware for the non-standard channel card may be replaced with the firmware for the standard channel card thereby converting the non-standard channel card to a converted channel card. The converted channel card may perform standard functions for a class of the channel card and may not perform the non-standard functions.

20 Claims, 9 Drawing Sheets

(56) References Cited

U.S. PATENT DOCUMENTS

| | | | | |
|---|---|---|---|---|
| 9,563,766 | B2 | 2/2017 | Lim | |
| 10,027,678 | B1 * | 7/2018 | Brandwine | G06F 11/3006 |
| 10,033,756 | B1 | 7/2018 | Rangarajan | |
| 10,075,334 | B1 | 9/2018 | Kozura | |
| 11,252,192 | B1 | 2/2022 | Kwan | |
| 11,868,551 | B1 * | 1/2024 | Pelissier | G06F 3/038 |
| 2004/0025036 | A1 * | 2/2004 | Balard | G06F 21/575 713/176 |
| 2004/0128514 | A1 | 7/2004 | Rhoads | |
| 2005/0048924 | A1 | 3/2005 | Nelson | |
| 2005/0078088 | A1 | 4/2005 | Davis | |
| 2005/0195975 | A1 | 9/2005 | Kawakita | |
| 2006/0143543 | A1 | 6/2006 | Mandrell | |
| 2006/0285502 | A1 | 12/2006 | Bigioi | |
| 2007/0199047 | A1 | 8/2007 | Gibart | |
| 2008/0226005 | A1 | 9/2008 | Kim | |
| 2009/0014519 | A1 | 1/2009 | Singh | |
| 2009/0069049 | A1 | 3/2009 | Jain | |
| 2009/0094681 | A1 | 4/2009 | Sadler | |
| 2009/0256717 | A1 | 10/2009 | Iwai | |
| 2009/0265720 | A1 | 10/2009 | Nagampalli | |
| 2009/0320137 | A1 * | 12/2009 | White | H04L 63/1433 707/999.102 |
| 2010/0031325 | A1 * | 2/2010 | Maigne | G06F 21/53 718/1 |
| 2011/0099605 | A1 * | 4/2011 | Cha | H04L 63/20 726/3 |
| 2011/0307712 | A1 | 12/2011 | Sakthikumar | |
| 2012/0257118 | A1 | 10/2012 | Aotake | |
| 2013/0117766 | A1 | 5/2013 | Bax | |
| 2013/0283380 | A1 | 10/2013 | Thadikaran | |
| 2014/0108693 | A1 | 4/2014 | Minezaki | |
| 2015/0213355 | A1 | 7/2015 | Sharma | |
| 2016/0050071 | A1 * | 2/2016 | Collart | H04L 9/3234 713/193 |
| 2016/0142243 | A1 | 5/2016 | Karam | |
| 2016/0173578 | A1 | 6/2016 | Sharma | |
| 2017/0257365 | A1 | 9/2017 | Gonzalez | |
| 2018/0069834 | A1 | 3/2018 | Angelsmark | |
| 2018/0246732 | A1 | 8/2018 | Puri | |
| 2018/0288011 | A1 * | 10/2018 | Marquardt | H04L 63/0823 |
| 2019/0095372 | A1 | 3/2019 | Huang | |
| 2019/0245848 | A1 * | 8/2019 | Divoux | H04L 63/0815 |
| 2019/0286805 | A1 * | 9/2019 | Law | G06F 21/34 |
| 2019/0306018 | A1 | 10/2019 | Steverson | |
| 2019/0342079 | A1 | 11/2019 | Rudzitis | |
| 2020/0042709 | A1 * | 2/2020 | Fu | G06F 9/4401 |
| 2020/0322176 | A1 * | 10/2020 | Bhandari | H04L 9/0825 |
| 2020/0344325 | A1 | 10/2020 | Sarisky | |
| 2020/0396128 | A1 | 12/2020 | Tseng | |
| 2021/0097186 | A1 | 4/2021 | Mandal | |
| 2021/0120104 | A1 | 4/2021 | Al-Mufti | |
| 2021/0181817 | A1 | 6/2021 | Lu | |
| 2022/0027165 | A1 | 1/2022 | Juan | |
| 2022/0035685 | A1 | 2/2022 | Ghosh | |
| 2022/0091744 | A1 | 3/2022 | Kutner | |
| 2022/0100840 | A1 | 3/2022 | Shtalenkov | |
| 2022/0121619 | A1 * | 4/2022 | Sharma | G06F 16/122 |
| 2022/0147974 | A1 * | 5/2022 | Law | G06F 21/32 |
| 2022/0151022 | A1 | 5/2022 | Chikkur Dattatraya | |
| 2022/0207463 | A1 * | 6/2022 | Young | G06F 21/575 |
| 2022/0303779 | A1 | 9/2022 | Boyapalle | |
| 2022/0382866 | A1 | 12/2022 | Shroff | |
| 2022/0382867 | A1 | 12/2022 | Shroff | |
| 2022/0382912 | A1 | 12/2022 | Shroff | |
| 2022/0385462 | A1 | 12/2022 | Shroff | |
| 2022/0414027 | A1 * | 12/2022 | Iyer | G06F 9/541 |
| 2023/0259632 | A1 | 8/2023 | Marciano | |
| 2023/0328037 | A1 | 10/2023 | Sankaranarayanan | |
| 2024/0095328 | A1 * | 3/2024 | Ponsini | H04W 12/35 |
| 2024/0267251 | A1 | 8/2024 | Mishelevich | |
| 2025/0148078 | A1 | 5/2025 | Lal | |
| 2025/0200227 | A1 | 6/2025 | Shroff | |
| 2025/0200583 | A1 | 6/2025 | Wheeler | |
| 2025/0272363 | A1 | 8/2025 | Pathirana | |
| 2025/0272538 | A1 | 8/2025 | Pathirana | |
| 2026/0030356 | A1 | 1/2026 | Paulraj | |

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

* cited by examiner

MANAGING NON-STANDARD CHANNEL CARDS OF DATA PROCESSING SYSTEMS

FIELD

Embodiments disclosed herein relate generally to managing operation of data processing systems. More particularly, embodiments disclosed herein relate to systems and methods to manage non-standard channel cards of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
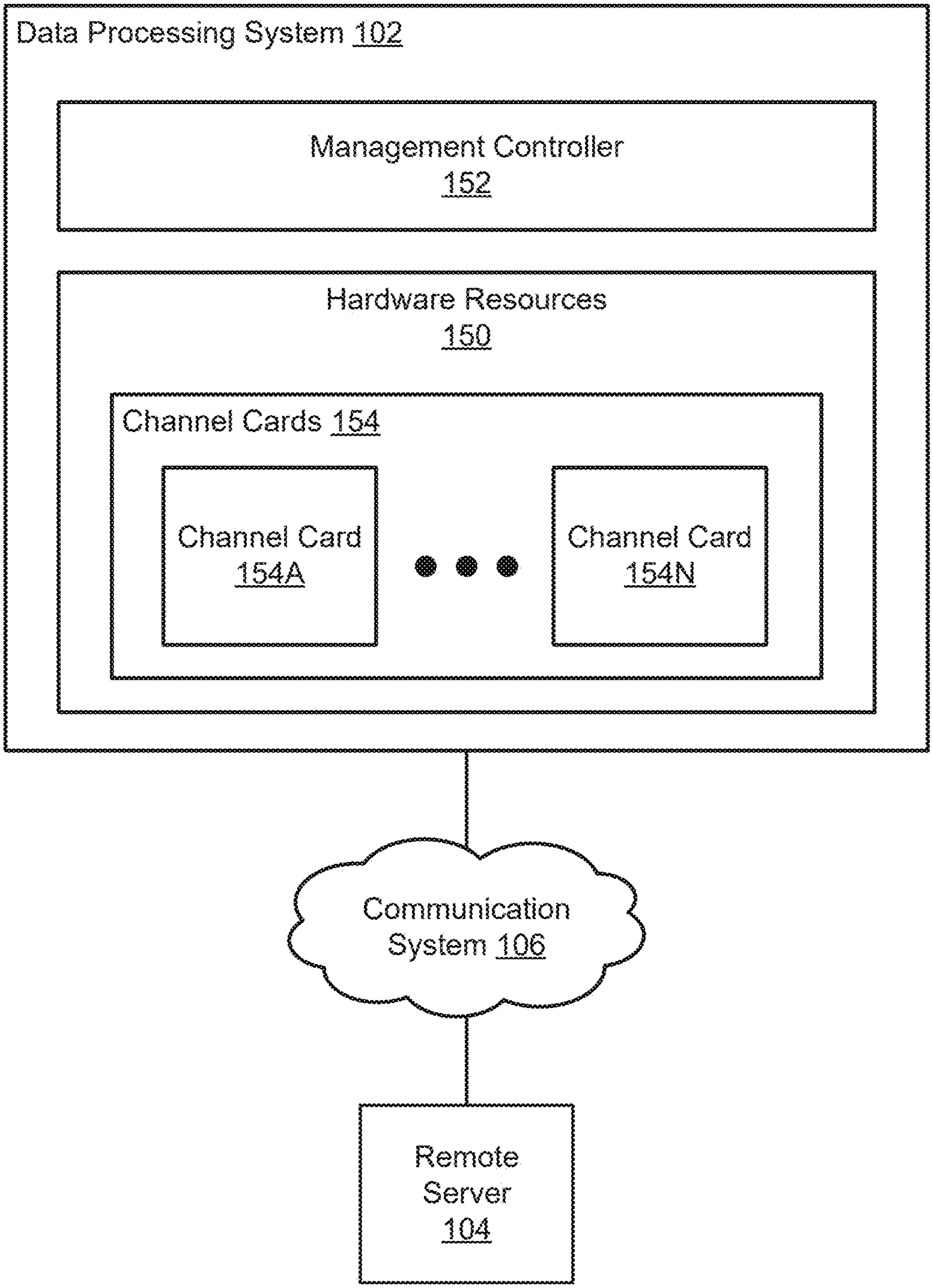
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services. To provide the computer-implemented services, hardware resources of the data processing system such as memory, processors, channel cards, etc., may operate in cooperation with one another. During cooperative operation, hardware resources may attempt to access information stored by other hardware resources, may attempt to issue commands to other hardware resources, and/or may otherwise attempt to activate functions of other hardware resources.

However, interactions between hardware components of the hardware resources may be limited be based on trustworthiness of the hardware components. Therefore, if a hardware component (e.g., a channel card) is not considered sufficiently trustworthy by the data processing system (and/or a management entity for the data processing system), functionality (e.g., availability of functions) of the hardware component may be limited. Doing so may reduce a quality and/or reliability of the computer-implemented services offered to downstream consumers of the computer-implemented services (e.g., a user of the data processing system).

For example, a user may replace a stock channel card (e.g., a standard channel card) that was manufactured by the manufacturer of the data processing system with an aftermarket channel card (e.g., a non-standard channel card). The aftermarket channel card may be a configurable hardware component and may include different (e.g., additional) functionality from the stock channel card, the additional functionality being enabled by firmware installed on the aftermarket channel card. For example, the aftermarket channel card may include standard functions (e.g., known functionality, based on a current or preceding industry standard with which the aftermarket channel card is compliant) and non-standard functions.

Due to a lack of knowledge and/or a lack of support for the non-standard functions of the aftermarket channel card by the manufacturer of the data processing system, the aftermarket channel card may be considered less trustworthy (e.g., more likely to host malicious software) than stock hardware components of the hardware resources. The management entity (e.g., a management controller) may subsequently limit the aftermarket channel card's ability to interact with the other hardware components. To do so, the management controller may intercept communications, host and/or utilize software to translate commands and/or error messages from the channel card to a format readable by the other hardware components, block attempted interactions (e.g., based on a list of previously established allowed interactions for the aftermarket channel card), and/or may otherwise limit functionality of the aftermarket channel card.

Consequently, non-standard functions (and/or standard functions) of the aftermarket channel card may be limited and/or unavailable and an undesirable quantity of computing resources may be consumed during management of the aftermarket channel card.

To overcome the above-discussed challenges, non-standard channel cards may be converted to standard channel cards. For example, firmware installed on an aftermarket channel card may be removed and replaced with firmware authorized by a manufacturer of the data processing system.

By doing so, non-standard functions of the aftermarket channel card may be unavailable to a user and only standard functions for a class of the channel card may be available to the user. In addition, the converted channel card may be considered sufficiently trustworthy (e.g., by a management entity) and, therefore, the limitations imposed on the channel card may be lifted. Doing so may increase a quality and/or reliability of computer-implemented services based, at least in part, on the standard functions of the channel card.

Thus, an improved system may be obtained where non-standard hardware components may be converted to standard hardware components to increase a trustworthiness for the hardware components and potentially expand available functionality of the hardware components for users. In addition, limited computing resources of the system may be advantageously saved, which may improve the functionality of the system itself.

In an embodiment, a method for managing operation of a data processing system is provided. The method may include: making an identification that a channel card of the data processing system is a non-standard channel card; based on the identification: making a determination, by a management controller of the data processing system and based on user input from a user, regarding whether the non-standard channel card is to be converted to a standard channel card; in an instance of the determination in which the non-standard channel card is to be converted to the standard channel card: obtaining, by the management controller and via an out-of-band communication channel, a certificate for the standard channel card from a remote server; performing, using the certificate, an action set to convert the non-standard channel card to the standard channel card to obtain a converted channel card; and providing, using the converted channel card, computer-implemented services.

The non-standard channel card may be configured to perform at least one non-standard function based on standard functions of a class of the channel card.

The standard channel card may be configured to perform the standard functions and not the at least one non-standard function and the standard channel card may have a first level of trust for accessing the hardware resources.

The non-standard channel card may have a second level of trust for accessing hardware resources of the data processing system and the first level of trust may be associated with a higher degree of authorization for accessing the hardware resources than a degree of authorization for accessing the hardware resources associated with the second level of trust.

The identification may be made by a basic input/output system (BIOS) of the data processing system during a startup procedure for the data processing system.

Making the determination may include: assuming, by the management controller, control over a display and one or more human interface devices (HIDs) of the data processing system; presenting, by the management controller and using at least the display, information to the user; and obtaining, by the management controller and via at least the one or more HIDs, the user input.

The certificate may include a cryptographically verifiable data structure delegating a right to use firmware associated with the standard channel card to the user, the firmware associated with the standard channel card being usable to activate the standard functions.

Performing the action set may include: replacing firmware associated with the non-standard channel card with the firmware associated with the standard channel card, the firmware associated with the non-standard channel card being usable to activate the at least one non-standard function.

Performing the action set may also include: preventing, by the management controller, future instances of activation of the at least one non-standard feature.

The management controller may be separate from and tasked with managing operation of hardware resources of the data processing system, the hardware resources including the channel card.

The data processing system may include a network module adapted to separately advertise network endpoints for the management controller and hardware resources of the data processing system, the network endpoints being usable by the remote server to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using various components of hardware resources of the data processing system, such as channel cards (e.g., graphics cards, network interface cards (NICs), accelerator cards, expansion cards).

To provide the computer-implemented services, hardware components of the system (e.g., a data processing system) may interact with one another cooperatively. For example, the computer-implemented services may require cooperative interaction between processors, memory modules, storage devices, and/or the channel cards. Based on these interactions, the hardware components may support execution of any number and/or types of software components (e.g., applications hosted by the hardware components), and, in some combination, the hardware and software components may provide for various types of computer-implemented services.

The interactions between the hardware and/or software components may include activation of functions of various hardware components. For example, a channel card may issue a request and/or command to a hardware component (e.g., a memory module) to activate a function of the hardware component (e.g., requesting access to a portion of data stored by the memory module).

However, the interactions may be limited based on levels of trust (e.g., indicating degrees of trustworthiness) for the hardware components. For example, some types of channel cards may present a higher degree of security risk due to, for example, an increased likelihood that the channel card may host malicious software and/or may be vulnerable to compromise by a malicious entity. Compromise of the channel card may lead to compromise of the other hardware components and/or other in-band components of the data processing system if the compromised channel card is able to access the other hardware components and/or otherwise interact with the other hardware components.

Hardware components may be considered as having an increased risk of compromise if, for example, the hardware components are non-standard hardware components. For example, a channel card may be a non-standard channel card if the channel card includes standard functions (e.g., known functionality, based on a current or preceding industry standard for a class of the channel card with which the channel card is compliant) and at least one non-standard function. The class of the channel card may be, for example, a graphics card (e.g., a graphics processing unit (GPU)). A standard graphics card may provide standard functions according to an industry standard for graphics cards and a non-standard graphics card may provide access to the standard functions and one or more additional non-standard functions.

To reduce a likelihood of compromise of other hardware components of the data processing system due to interactions with non-standard channel cards, functionality of channel cards may be limited based on levels of trust for the channel cards. To do so, a management entity (e.g., a management controller) may snoop communications between the non-standard channel cards and the other hardware components, may block interactions from occurring, may host and/or utilize software to convert commands and/or error messages generated by the non-standard channel cards into a format that is readable by the other hardware components, and/or may otherwise manage the operation of the non-standard channel cards. Doing so may reduce available functionality of the non-standard channel cards to the user of the data processing system thereby adversely impacting the computer-implemented services provided to the user.

In general, embodiments disclosed herein may provide methods, systems, and/or devices for managing operation of data processing systems in a manner that increases a likelihood of providing the computer-implemented services as desired by a downstream consumer of the computer-implemented services. To do so, non-standard hardware components (e.g., non-standard channel cards) may be converted to standard hardware components.

Converting a channel card from a non-standard channel card to a standard channel card may include removing (e.g., deleting) firmware installed on the non-standard channel card and installing firmware that enables standard functions for a class of the channel card. For example, the channel card may be a non-standard graphics card configured to perform at least one non-standard function outside of an industry standard for functions of graphics cards. However, the non-standard graphics card may not be considered sufficiently trustworthy by the management controller and, therefore, functionality of the non-standard graphics card may be limited, and technical support may be unavailable for the non-standard graphics card by the manufacturer of the data processing system.

Limiting the functionality of the non-standard graphics card may reduce an availability of standard and/or non-standard functions of the graphics card thereby adversely impacting a user's experience while utilizing the data processing system (e.g., graphics may not be rendered and displayed as desired). Consequently, the computer-implemented services provided to the user (e.g., graphics displayed by a display of the data processing system based on operation of the graphics card) may be of a reduced quality.

To increase a quality and/or reliability of the computer-implemented services provided, at least in part, using the non-standard channel card, the non-standard channel card may be converted to a standard channel card. The management controller may obtain user input regarding whether the non-standard channel card is to be converted to a standard channel card. If the user input indicates that the channel card is to be converted, the management controller may retrieve, from a remote server, a certificate indicating that the user has a right to use firmware for the standard channel card (e.g., the user has an active license for the firmware for the standard channel card).

Using the certificate, the management controller may interact with the non-standard channel card to delete the existing firmware, install the firmware for the standard channel card, and modify configurations and/or data structures to reflect that the non-standard channel card may now function as a standard channel card (e.g., restrictions may be lifted, software usable to translate commands generated by the non-standard channel card may be archived and/or deleted).

By doing so, the converted channel card may be placed in an operable state so that, during a future startup procedure for the data processing system, firmware for the converted channel card may be booted and an operating system of the data processing system may treat the converted channel card as the standard channel card. Consequently, computer-implemented services provided based, at least in part, on operation of the converted channel card, may be of an increased quality and/or reliability for the user.

To provide the above-mentioned functionality, the system of FIG. 1A may include data processing system 102, remote server 104, and communication system 106. Data processing system 102 may include at least hardware resources 150 and management controller 152. The system, any components thereof, and/or any other types of devices or components not shown in FIG. 1A may perform all, or a portion of the computer-implemented services independently and/or cooperatively. Each of these components is discussed below.

Hardware resources 150 may include any number of hardware components (e.g., memory, processors, channel cards). For example, hardware resources 150 may include any number of channel cards 154 (e.g., 154A-154N). Channel cards 154 may include expansion cards and/or adapter cards that may add specific functions to data processing system 102. Each channel card of channel cards 154 may be designed to perform a specific task and/or provide additional capabilities to data processing system 102 (e.g., beyond what other hardware components such as a motherboard of data processing system 102 may offer). For example, channel cards 154 may include graphics processing units (GPUs), network interface cards (NICs), storage controller cards, wireless network cards, Universal Serial Bus (USB) expansion cards, and/or other types of cards.

Channel cards 154 may include any number of stock channel cards (e.g., installed by and/or manufactured by a manufacturer of data processing system 102) and/or aftermarket channel cards (e.g., added by a user of data processing system 102) and, therefore, may include a heterogeneous set of channel cards. Channel cards 154 may function in cooperation with other components of hardware resources 150.

For example, a stock channel card (e.g., a channel card that was manufactured by a manufacturer of the data processing system and performs the standard functions) may be replaced with an aftermarket channel card (e.g., a non-standard channel card), and/or aftermarket channel cards may be added to the data processing system. Functionality of the aftermarket channel cards may vary to a high degree depending on their vendor (e.g., manufacturer of the channel card) and/or due to the programmable nature of some channel cards (e.g., SmartNICs, data processing unit (DPU) cards, etc.).

Channel cards 154 may include programmable platform devices capable of performing various functions in various different ways and/or some may require special methods of communication (e.g., specialized application programming interfaces (APIs)). In other words, some functionality of the channel cards may (i) not adhere to an industry standard for classes of channel cards, (ii) may be in addition to the functionality specified by the industry standard, and/or may otherwise require specialized or unusual information to utilize such functions. These functions may be referred to as non-standard functions.

Hardware resources 150 may host applications and/or other software, and store and/or execute instructions provided by the applications and/or the software in order to facilitate provision of a computer-implemented service. For example, an operating system hosted by hardware resources 150 may manage interactions between channel cards and other hardware components (e.g., processors, storage devices, memory modules, etc., not shown) of hardware resources 150 based on levels of trust for the channel cards.

To do so, the operating system (or other software) may: (i) identify that a channel card of the data processing system has attempted an interaction with a hardware component of the hardware resources, (ii) obtain, using a channel card trust table, a level of trust for the channel card, and/or (iii) determine, based on the level of trust, whether the channel card is authorized to interact with the hardware component. If it is determined that the channel card is authorized to interact with the hardware component, the operating system may allow the attempted interaction to occur. If it is determined that the channel card is not authorized to interact with the hardware component, the attempted interaction may be denied.

By doing so, hardware components of data processing system 102 may be more likely to be protected from compromise. However, limiting functionality of channel cards 154 based on the levels of trust may make at least a portion of the desired computer-implemented services unavailable and/or may adversely impact a quality and/or reliability of the computer-implemented services provided to the user.

To increase a likelihood of providing the desired computer-implemented services, management controller 152 may facilitate conversion of non-standard channel cards to standard channel cards. Management controller 152 may be separate from and tasked with managing operation of hardware resources 150. For example, upon addition of a channel card (e.g., 154A) to data processing system 102, management controller 152 may: (i) obtain a notification (e.g., from a startup management entity such as a BIOS) that channel card 154 has been operably connected to data processing system, (ii) identify that channel card 154A is a non-standard channel card, and/or (iii) based on the identification, obtain user input indicating whether the non-standard channel card is to be converted to a standard channel card.

If the user input indicates that the non-standard channel card is not to be converted to the standard channel card, management controller 152 may: (i) typify the channel card to obtain a type of the channel card, (ii) assign, based on the type of the channel card and a schema for assigning levels of trust, a level of trust for the channel card, (iii) populate, using the level of trust, the channel card trust table, (iv) provide the channel card trust table to a basic input/output system (BIOS) of the data processing system (not shown), and/or (v) perform other actions. By doing so, all channel cards added to data processing system 102 may be assigned levels of trust and, therefore, may have different degrees of authorization to access hardware resources 150. By limiting permissions for channel cards that are not authorized and/or are not manufactured by the manufacturer of data processing system 102, a likelihood of compromise of hardware resources 150 may be reduced.

The BIOS (e.g., firmware installed on data processing system 102) may publish the channel card trust table during a startup procedure for data processing system 102 so that the channel card trust table is usable by the operating system during operation of data processing system 102. Refer to FIG. 2B for additional details regarding populating and publishing the channel card trust table.

However, limiting interactions based on levels of trust may limit available functionality of the channel cards for users. Therefore, if the user input indicates that the non-standard channel card is to be converted to the standard channel card, management controller 152 may: (i) obtain, via an out-of-band communication channel, a certificate for the standard channel card from a remote server (e.g., remote server 104), and/or (ii) perform, cooperatively with at least a portion of hardware resources 150 and using the certificate, an action set to convert the non-standard channel card to the standard channel card to obtain a converted channel card.

The certificate may be a cryptographically verifiable data structure indicating that the user has a right to use firmware associated with the standard channel card and performing the action set may include at least: (i) deleting firmware installed on the channel card, and (ii) installing the firmware associated with the standard channel card. By doing so, standard functions for the class of the channel card may be available to the user and the non-standard functions may no longer be available. Consequently, a level of trust for the converted channel card may be modified to reflect that the channel card is to be considered a standard channel card (e.g., no restrictions may exist for the standard channel card).

By doing so, data processing system 102 may provide computer-implemented services to the user of data processing system 102 using at least the converted channel card. By converting the channel card to a standard channel card, a quality and/or reliability of the computer-implemented services may be increased.

Management controller 152 may perform additional actions to prevent future instances of re-activation of the non-standard features for the converted channel card. For example, management controller 152 may continuously monitor firmware installed on the converted channel card to identify any firmware that may enable re-activation of the non-standard features.

Remote server 104 may include any number of systems remote to data processing system 102 and may be managed by a manufacturer/vendor of data processing system 102. Remote server 104 may interact with management controller 152 to verify that the user of data processing system 102 is authorized to use firmware for a standard channel card (e.g., the user has an active license for the firmware). Remote server 104 may, therefore, generate and/or store certificates and may provide the certificates to management controller 152 via the out-of-band communication channel.

Management controller 152 may be distinct from and may operate independently from hardware resources 150. To facilitate cooperation between hardware resources 150 and management controller 152, hardware resources 150 may host an agent for management controller 152 (not shown). The agent (e.g., a software program) may facilitate communication between management controller 152 and hardware resources 150. Refer to the discussion of FIG. 1B for more information regarding the functionality of management controller 152.

When providing their functionality, any of data processing system 102, remote server 104, and/or components thereof may perform all, or a portion of the actions and methods illustrated in FIGS. 2A-3C.

Data processing system 102 (and/or components thereof) may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with communication system 106. Communication system 106 may facilitate communications between the components of FIG. 1A. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

Figure 1B:
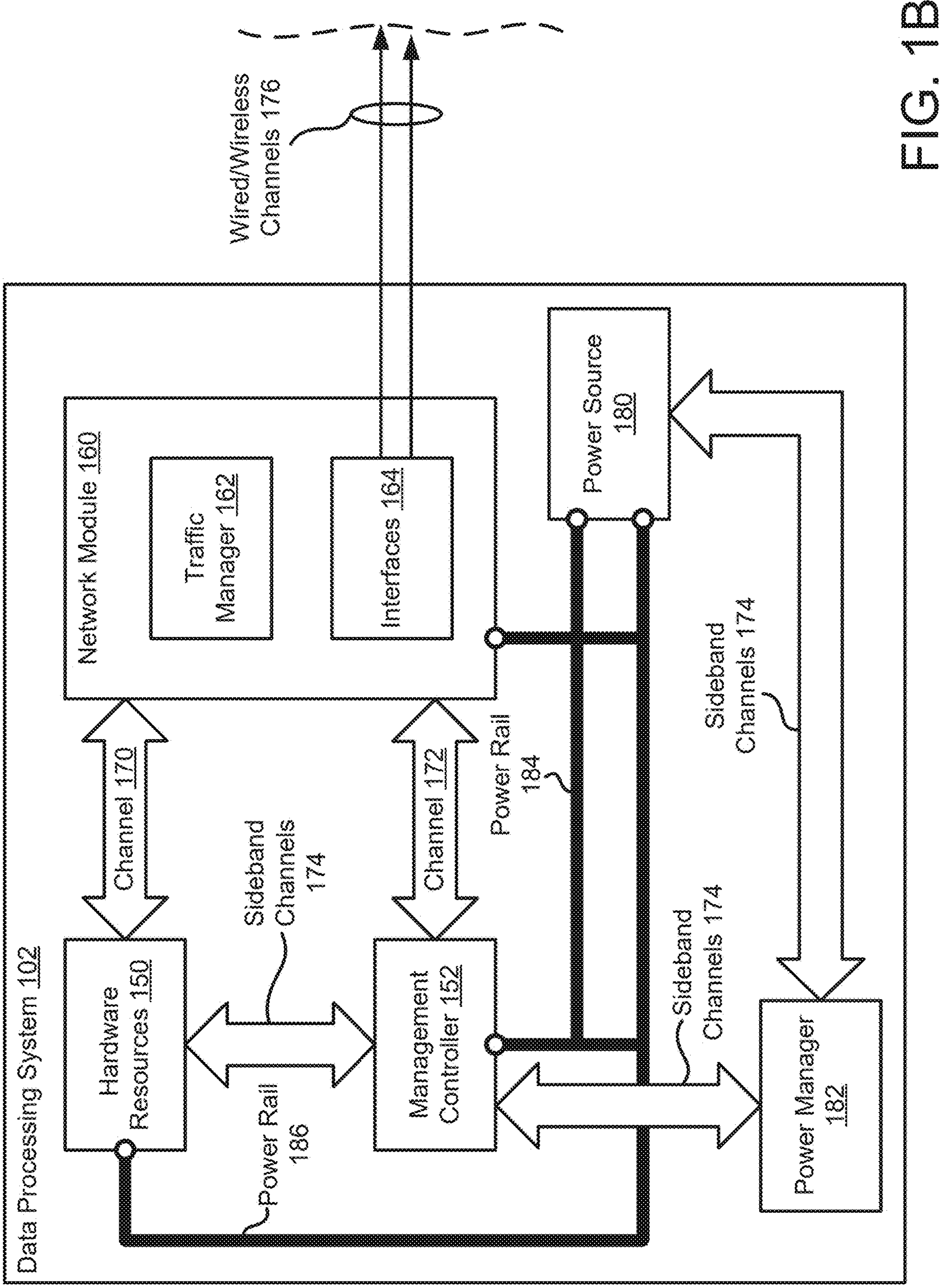
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of the system shown in FIG. 1A.

To provide computer-implemented services, data processing system 102 may include any quantity of hardware resources 150. Hardware resources 150 may be in-band hardware components, and may include a processor operably coupled to memory, storage, channel cards, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150, of a host data processing system 102). Management controller 152 may provide various management functionalities for data processing system 102. For example, management controller 152 may monitor various ongoing processes performed by the in-band components, may manage power distribution, may participate in thermal management, and/or other may perform other functions, such as managing security protocols for interactions between channel cards and other hardware components of hardware resources 150 and/or conversion of channel cards from non-standard channel cards to standard channel cards.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 152 and hardware resources 150 so that management controller 152 may identify standard and/or non-standard functions of channel cards added to data processing system 102, modify firmware installed on the channel cards, and/or otherwise manage functionality of the channel cards.

To reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any portion of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system. Network module 160 may, for example, host a transmission control protocol/internet protocol (TCP/IP) stack to facilitate network communications via in-band and/or out-of-band communication channels. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints.

For example, an out-of-band communication channel (e.g., 172) that services management controller 152 and an in-band communication channel (e.g., 170) that services hardware resources 150 may run through network module 160. Therefore, other entities (e.g., remote server 104) may address communications to hardware resources 150 via the in-band communication channel (e.g., 170) and to management controller 152 via the out-of-band communication channel (e.g., 172).

When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out-of-band components of data processing system 102 may appear to be two independent network entities, that may independently addressable, and otherwise unrelated to one another.

To facilitate management of data processing system 102 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
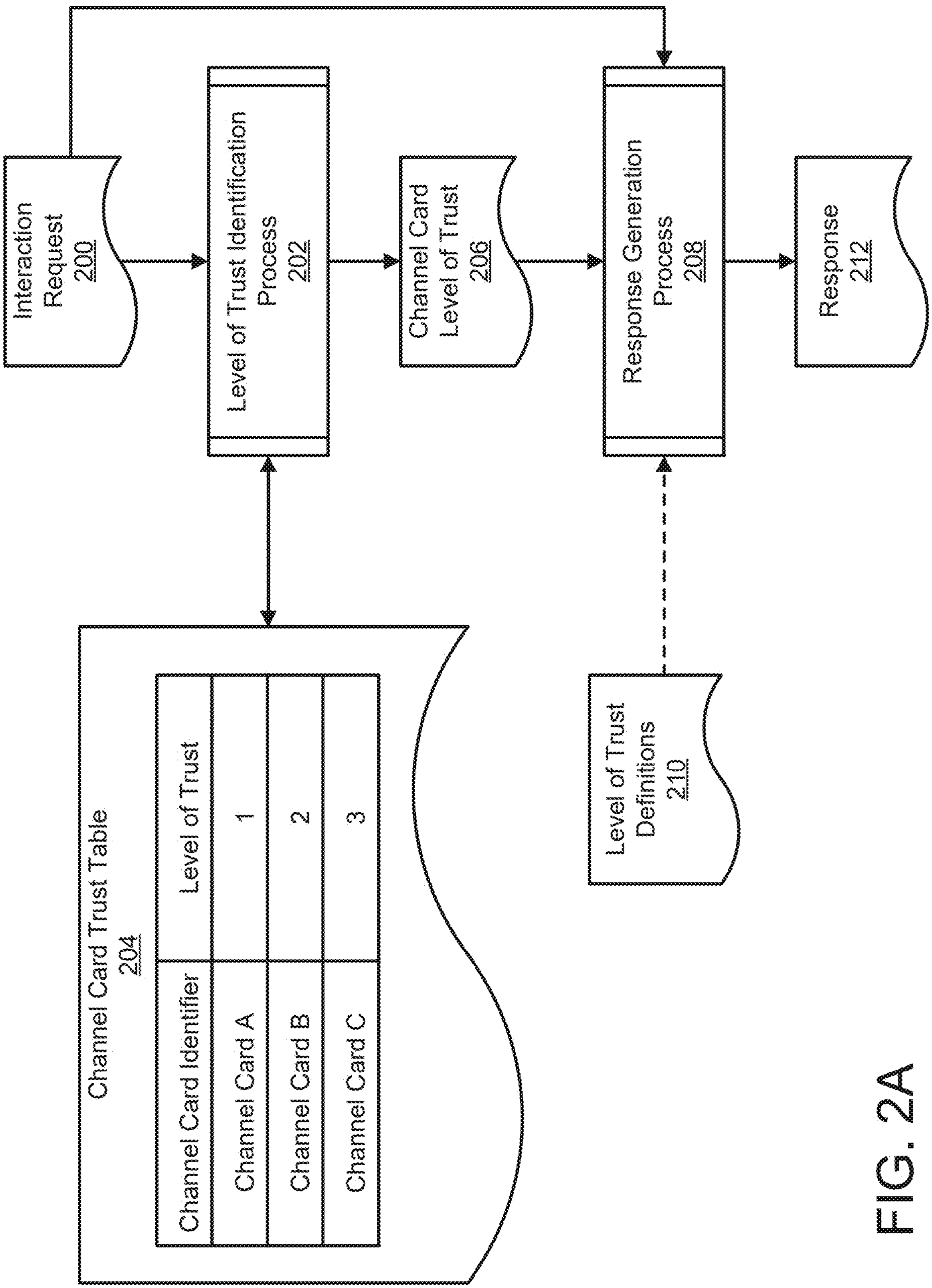
FIG. 2A shows a data flow diagram illustrating management of interactions between components of a data processing system in accordance with an embodiment.
Figure 2B:
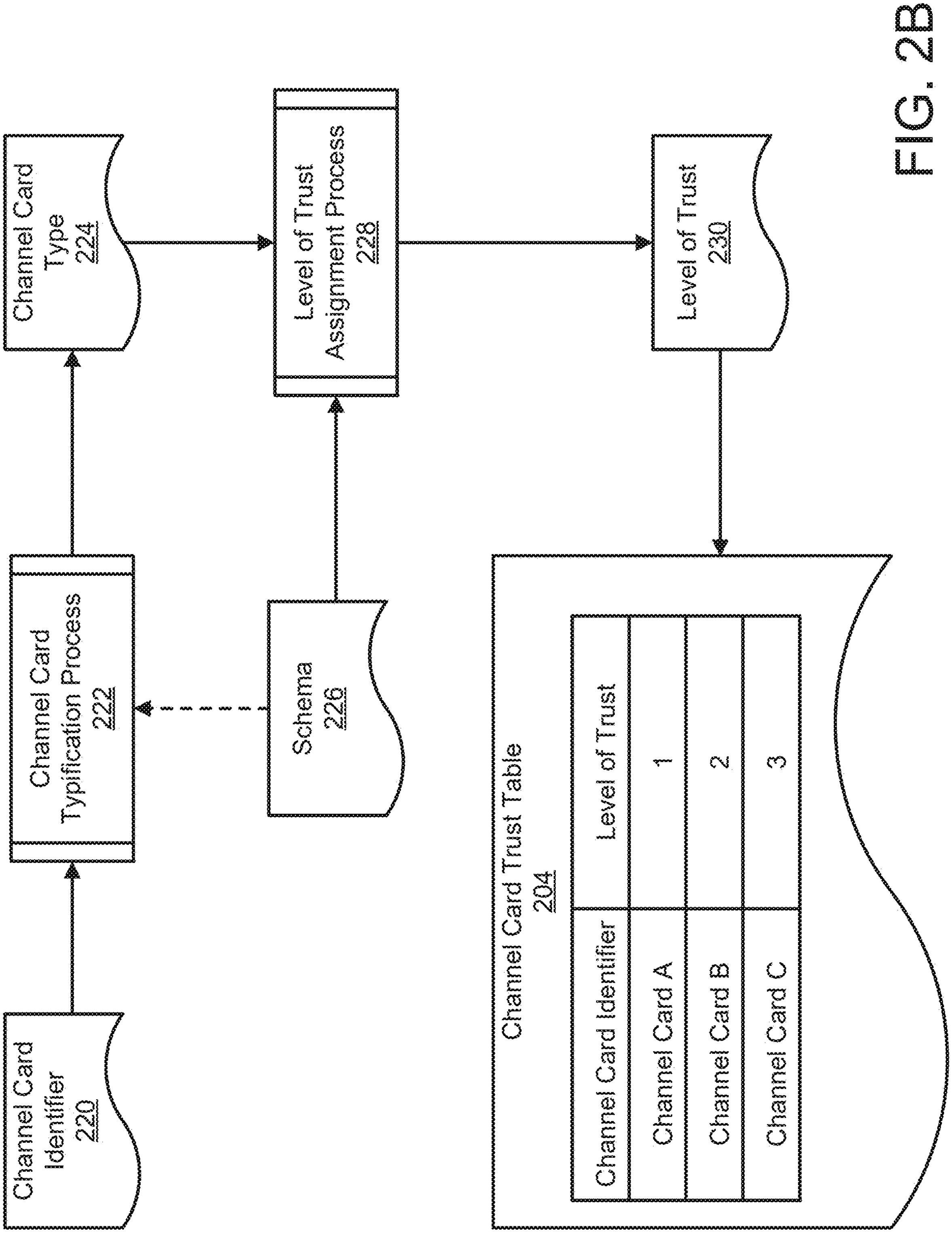
FIG. 2B shows a data flow diagram illustrating management of levels of trust for components of a data processing system in accordance with an embodiment.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 206, etc.) is used to represent data structures and a second set of shapes (e.g., 202, 208, etc.) is used to represent processes performed using and/or that generate data.

Turning to FIG. 2A, a first data flow diagram in accordance with an embodiment is shown. The first data flow diagram may illustrate data used in and data processing performed in managing interactions between components of a data processing system.

Consider a scenario in which a channel card of a data processing system attempts to interact with another hardware component of the hardware resources of the data processing system. For example, the channel card may attempt to access a portion of data stored by a memory module of the data processing system. To do so, the channel card may provide a request to activate a function of the memory module that allows for the channel card to access the portion of the data, etc.

To attempt to interact with the hardware component, the channel card may generate interaction request 200. The channel card may attempt to provide interaction request 200 (e.g., via an in-band channel of the data processing system) to the hardware component and/or to an intermediary hardware component responsible for managing interactions between channel cards and hardware components. For example, the intermediary hardware component may be a processor of the data processing system that hosts an operating system (e.g., a management entity). The operating system, therefore, may receive and/or intercept interaction request 200.

Interaction request 200 may include: (i) an identifier for the channel card, (ii) an identifier for the desired recipient of interaction request 200 (e.g., the hardware component), (iii) instructions for execution by the hardware component to activate the desired function of the hardware component, (iv) a timestamp for the interaction request, and/or (v) other data.

The operating system may obtain and/or intercept interaction requests from channel cards to determine whether the channel cards are authorized to perform the requested interactions. Therefore, to determine whether the channel card is authorized to interact with the hardware component, the operating system may perform level of trust identification process 202.

During level of trust identification process 202, the identifier for the channel card may be extracted from interaction request 200 and used to search channel card trust table 204 for a level of trust associated with the channel card. Channel card trust table 204 may be stored by the data processing system and may include any number of levels of trust corresponding to channel cards of the data processing system. Channel card trust table 204 may be organized as a series of columns and rows as shown in FIG. 2A with a first column including channel card identifiers and a second column including levels of trust corresponding to the channel cards indicated by the first column.

The channel card identifiers included in the first column may be represented in any manner including, for example, a letter, number, character, and/or combination of the letters numbers and characters to represent a particular channel card.

Similarly, levels of trust included in the second column may be represented in any manner including, for example, numbers, letters, characters, and/or combinations of numbers, letters, and characters.

The levels of trust assigned to each channel card may be based associations between different types of channel cards and different levels of trust. For example, a first type of channel card may be a channel card that is constructed by a manufacturer of the data processing system, a second type of channel card may be a channel card that is authorized by the manufacturer of the data processing system but is not constructed by the manufacturer, and a third type of channel card may be a channel card that is not authorized by the manufacturer. Refer to FIG. 2B for additional details regarding assigning types of channel cards and levels of trust for channel cards.

Channel card trust table 204 may also include a key for the table indicating descriptions for each level of trust of the levels of trust. For example, each level of trust may be associated with a degree of authorization (e.g., level of authority and control that a manufacturer of a host system had over construction/development of a hosted channel card) for accessing the hardware resources of the data processing system.

For example, channel card A may be the first type of channel card. The first type of channel card may be keyed to a level of trust of 1 and, therefore, channel card A may be assigned a level of trust of 1. The key for the table may indicate that the level of trust of 1 indicates that channel card A has a first degree of authorization for accessing the hardware resources that allows activation of all functions of the hardware resources by the channel card. Channel card A may, therefore, be a channel card manufactured by the manufacturer of the data processing system (e.g., may be a stock channel card).

In addition, channel card B may be the second type of channel card. The second type of channel card may be keyed to a level of trust of 2 and, therefore, channel card B may be assigned a level of trust of 2. The key for the table may indicate that the level of trust of 2 indicates that channel card B has a second degree of authorization for accessing the hardware resources that allows activation of a portion of functions of a portion of the hardware resources by the channel card. Channel card B may, therefore, be a channel card manufactured by a third-party manufacturer (e.g., a manufacturer that is not the manufacturer of the data processing system).

However, as the manufacturer of the data processing system has authorized the second type of channel card for use in the data processing system, channel card B may be manufactured by a third-party manufacturer that is known and/or trusted by the manufacturer of the data processing system. Consequently, channel card B may be authorized to activate functions of hardware resources that are considered less likely to expose the data processing system to compromise and may not be authorized to activate functions of the hardware resources that are considered more likely to expose the data processing system to compromise. A likelihood of exposure to compromise for different functions of the hardware resources may be determined by any entity and may be based on any criteria (e.g., to meet needs of a downstream consumer).

In addition, channel card C may be the third type of channel card. The third type of channel card may be keyed to a level of trust of 3 and, therefore, channel card C may be assigned a level of trust of 3. The key for the table may indicate that the level of trust of 3 indicates that channel card C has a third degree of authorization for accessing the hardware resources that allows no activation of functions of the hardware resources by the channel card. Channel card C may, therefore, be a channel card manufactured by a third-party manufacturer (e.g., a manufacturer that is not the manufacturer of the data processing system).

However, the third type of channel card may not be authorized by the manufacturer of the data processing system and, therefore, the manufacturer may have no knowledge and/or may not trust the third-party manufacturer of channel card C. Consequently, channel card C may not be allowed to activate any functions of the hardware resources, as channel card C may be compromised and/or may be vulnerable to compromise by malicious entities.

Therefore, the first type of channel card (e.g., channel card A) may have a higher degree of authorization for accessing the hardware resources than the second type of channel card (e.g., channel card B). In addition, the second type of channel card may have a higher degree of authorization for accessing the hardware resources than the third type of channel card (e.g., channel card C).

For example, the first type of channel card may be authorized to access all data stored by a memory module, the second type of channel card may be authorized to access a portion of data stored by a memory module, and the third type of channel card may not be authorized to access any data stored by the memory module.

Levels of trust may be assigned and/or represented via other methods and may be keyed to different degrees of authorization for accessing the hardware resources without departing from embodiments disclosed herein. Further, the specific information content of channel card trust table 204 may include additional, different, and/or less information. For example, rather than including quantifications for levels, the table may include information on which the levels are based.

Further, it will be appreciated that the trust table may include additional information to further facilitate more granular decision making with respect to channel cards. For example, each channel card may be given multiple levels of trust associated with different types of hardware components. Such multiple levels may allow for different types of interaction limits. In an example, a first type of third party developed channel card may be given a low level of trust for storage devices but a moderate level of trust for communication devices and a second type of third party developed channel card may be given a low level of trust for storage devices and a low level of trust for communication devices. Thus, channel cards having similar levels of management and control by a manufacturer may be given different levels of trust with respect to different types of other hardware components. Accordingly, while the first type of third party developed channel card may be allowed to communicate externally, the second type of third party developed channel card may be prevented from communicating externally. This approach may allow the type of channel card in addition to level of control by a host device manufacturer to be taken into account.

Therefore, during level of trust identification process 202, the operating system of the data processing system may utilize the channel card identifier extracted from interaction request 200 as a key for channel card trust table 204 to perform a lookup process to obtain channel card level of trust 206.

For example, if interaction request 200 indicates that the channel card has a channel card identifier of "channel card B," then channel card level of trust 206 may indicate that the channel card has an associated level of trust of "2."

Channel card level of trust 206 may, therefore, include the level of trust for the channel card and/or any other information. Channel card level of trust 206 may be used during response generation process 208 to determine whether interaction request 200 is to be approved.

During response generation process 208, it may be determined whether the channel card is authorized to activate the function of the hardware resource indicated by interaction request 200. To do so, level of trust definitions 210 may be utilized. Level of trust definitions 210 may include descriptions of each level of trust (e.g., 1, 2, 3) indicating the degree of authorization of access corresponding to each level of trust. Levels of trust definitions 210 may include lists of hardware components and/or functions of hardware components authorized for each level of trust, etc. At least a portion of the information included in level of trust definitions 210 may be included in channel card level of trust 206 and, therefore, level of trust definitions 210 may not be required to perform response generation process 208 (as indicated by the dashed line).

During response generation process 208, response 212 may be generated. If the requested function (e.g., indicated by interaction request 200) matches an authorized function for the level of trust assigned to the channel card, response 212 may include an indication that the attempted interaction is to be allowed to proceed. If the requested function does not match an authorized function for the level of trust assigned to the channel card, response 212 may include an indication that the attempted interaction is to be denied.

Response 212 may be provided to the channel card and/or to another entity responsible for allowing and/or denying the attempted interaction.

By doing so, a likelihood of compromise of the hardware resources may be reduced by limiting access to the hardware resources based on levels of trust for channel cards. Consequently, channel cards that have a higher likelihood of being compromised may have a lower degree of access to the hardware resources than channel cards that have a lower likelihood of being compromised.

Turning to FIG. 2B, a second data flow diagram in accordance with an embodiment is shown. The second data flow diagram may illustrate data used in and data processing performed in managing levels of trust for components of a data processing system.

Consider a scenario in which a channel card is added (e.g., operably connected) to the data processing system. A management controller of the data processing system may identify that the channel card has been added and may obtain channel card identifier 220 from the channel card. The channel card may be prompted by the management controller (e.g., via a sideband channel of the data processing system) and/or another entity to provide channel card identifier 220 to the management controller. Channel card identifier 220 may include, for example, a manufacturer of the channel card, a serial number for the channel card, and/or other identifying information for the channel card.

The management controller may be responsible for assigning levels of trust to channel cards. The levels of trust may be usable by an operating system of the data processing system to manage interactions between the channel cards and hardware components of the hardware resources (as described in FIG. 2A). To do so, the management controller may perform channel card typification process 222 using at least channel card identifier 220. During channel card typification process 222, the management controller may identify, based on information included in channel card identifier 220, channel card type 224 for the channel card.

During channel card typification process 222, the management controller may compare the manufacturer of the channel card, the serial number for the channel card, and/or other information for the channel card to types of channel cards as indicated by a schema (e.g., schema 226 and/or another schema). The line between schema 226 and channel card typification process 222 is shown as dashed to indicate that schema 226 may or may not be used during channel card typification process 222. The schema may include a rule set, table, and/or other data structure usable to assign types of channel cards.

For example, channel card identifier 220 may include information indicating that the channel card is manufactured by a manufacturer of the data processing system. The schema may indicate that if the channel card is manufactured by the manufacturer of the data processing system, the channel card is a first type of channel card.

In a second example, channel card identifier 220 may include information indicating that the channel card is manufactured by a vendor that is not the manufacturer of the data processing system. However, the serial number and manufacturer may be listed by the schema as authorized by the manufacturer of the data processing system and, therefore, the channel card may be a second type of channel card.

In a third example, channel card identifier 220 may include information indicating that channel card is manufactured by a vendor that is not the manufacturer of the data processing system. The serial and vendor may not be included in a list of authorized vendors and, therefore, the channel card may be a third type of channel card. Refer to FIG. 2A for additional details regarding types of channel cards.

Therefore, channel card type 224 may identify the channel card as the first type, the second type, the third type of channel cards, and/or another type. While described herein as including three types of channel cards, any number of types of channel cards may be included in the schema and assigned to channel cards without departing from embodiments disclosed herein.

Channel card type 224 may be utilized by the management controller to perform level of trust assignment process 228 to assign a level of trust to the channel card and obtain level of trust 230. During level of trust assignment process 228, the management controller may compare channel card type 224 to schema 226. Schema 226 may include a rule set, table, and/or other information usable to associate levels of trust with types of channel cards. For example, schema 226 may include mappings indicating: (i) the first type of channel card is to be assigned a level of trust of 1, (ii) the second type of channel card is to be assigned a level of trust of 2, and/or (iii) the third type of channel card is to be assigned a level of trust of 3. While described herein as including three levels of trust, any number of levels of trust may be assigned to types of channel cards based on the types of channel cards and/or based on other criteria without departing from embodiments disclosed herein.

Level of trust 230 may include the assigned level of trust for the channel card (e.g., 1, 2, 3) and/or other information. The other information may include an identifier for the channel card (e.g., from channel card identifier 220), a definition associated with the level of trust (e.g., indicating permissions allowed for the channel card, etc.

Level of trust 230 may be used to populate channel card trust table 204. For example, the channel card added to the data processing system may be channel card C and level of trust 230 may indicate that channel card C is to be assigned a level of trust of 3. The channel card identifier of "channel card C" and the level of trust of "3" may be added to channel card trust table 204 by the management controller.

Channel card trust table 204 may be provided by the management controller and via a sideband channel of the data processing system, to a BIOS of the data processing system. The BIOS of the data processing system may include firmware that manages startup procedures for the data processing system. For example, the BIOS may publish channel card trust table 204 during the startup procedure to make channel card trust table 204 available to an operating system of the data processing system. The operating system may then utilize channel card trust table 204 during operation of the data processing system as described in FIG. 2A.

Thus, using the data flows shown in FIGS. 2A-2B, channel cards added to the data processing system may be assigned levels of trust by the management controller, the management controller being separate from the hardware resources and tasked with managing the hardware resources. Therefore, in the event that the hardware resources are compromised by a malicious entity, the malicious entity may not be able to modify and/or access the levels of trust for the channel cards. Consequently, the channel card trust table may be made available to the hardware resources during startup but may not be modifiable by any potentially compromised hardware resources (and/or hosted software entities).

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 2C:
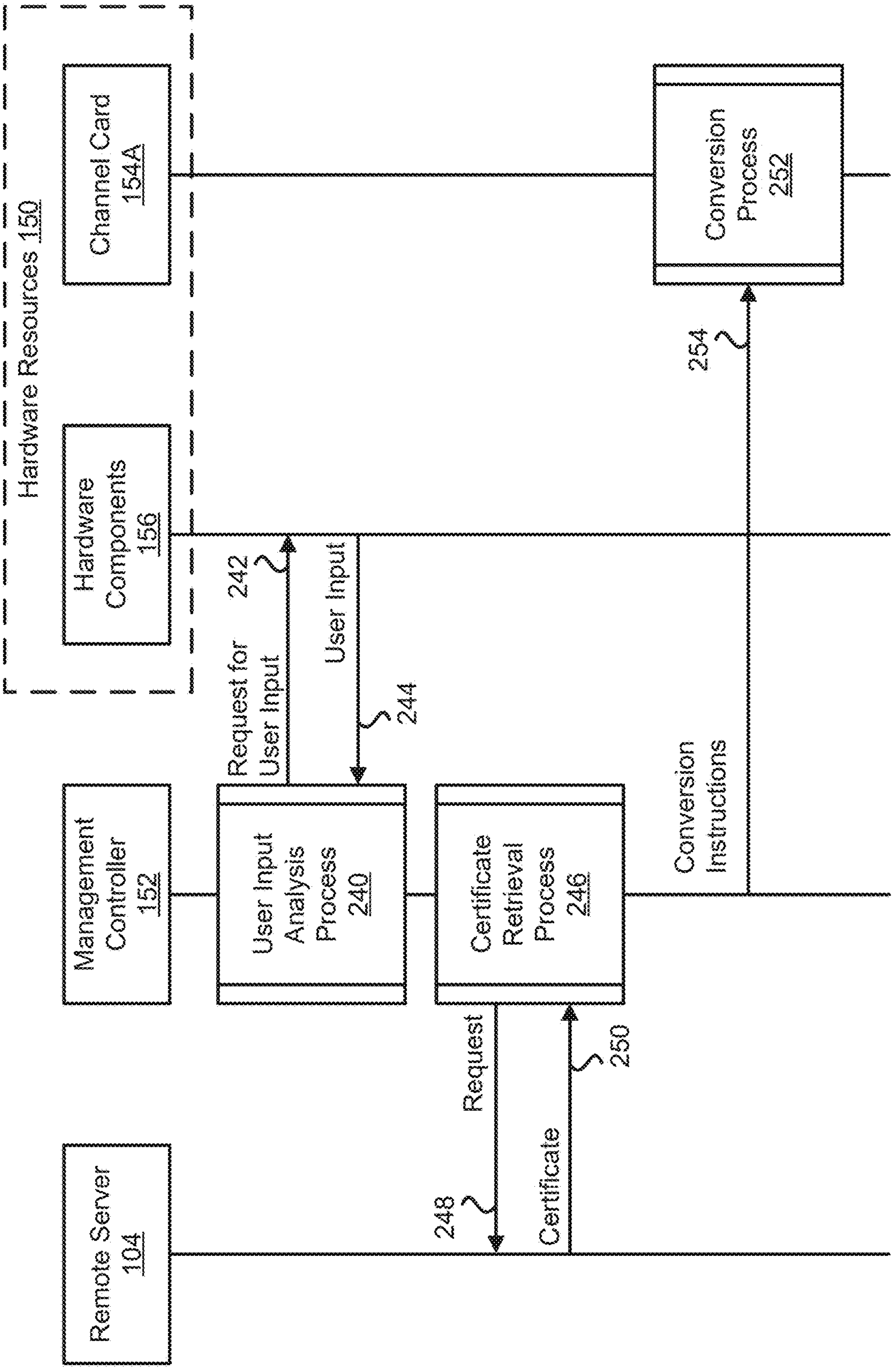
FIG. 2C shows an interaction diagram in accordance with an embodiment.

To further clarify embodiments disclosed herein, an interaction diagram in accordance with an embodiment is shown in FIG. 2C. This interaction diagram may illustrate how data may be obtained and used within the system of FIG. 1A.

In the interaction diagram, processes performed by and interactions between components of a system in accordance with an embodiment are shown. In the diagram, components of the system are illustrated using a first set of shapes (e.g., 104, 152, etc.), located towards the top of each figure. Lines descend from these shapes. Processes performed by the components of the system are illustrated using a second set of shapes (e.g., 240, 246, etc.) superimposed over these lines. Interactions (e.g., communication, data transmissions, etc.) between the components of the system are illustrated using a third set of shapes (e.g., 242, 244, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 242 may occur prior to the interaction labeled as 244. However, it will be appreciated that the processes and interactions may be performed in different orders, any may be omitted, and other processes or interactions may be performed without departing from embodiments disclosed herein.

Turning to FIG. 2C, an interaction diagram in accordance with an embodiment is shown. The interaction diagram may illustrate processes and interactions that may occur during conversion of a non-standard channel card to a standard channel card.

Consider a scenario in which channel card 154A is a non-standard channel card. Channel card 154A may be previously identified as operably connected to the data processing system (e.g., by a BIOS during a startup procedure for the data processing system) and management controller 152 (and/or another entity) may have previously performed a function identification process to determine that channel card 154A provides at least one non-standard function. The function identification process (not shown) may include obtaining, by management controller 152, a list of functions for channel card 154A (e.g., from channel card 154A, from a local database, from a remote entity) and comparing the list of the functions to a list of standard functions for a class of channel card 154A. Performing the function identification process may include at least a portion of the actions described during channel card typification process 222 in FIG. 2B. If any functions of the list of the functions are additional to the functions of the list of the standard functions, channel card 154A may be identified as a non-standard channel card.

Following identification of channel card 154A as a non-standard channel card, management controller 152 may perform user input analysis process 240 to determine whether channel card 154A is to be converted to a standard channel card. During user input analysis process 240, at least interactions 242 and 244 may be performed. To determine whether channel card 154A is to be converted to a standard channel card, management controller 152 may interact with and/or assume control over one or more of hardware components 156. Management controller 152 may be tasked with managing hardware resources 150 and, therefore may be able to assume control of (e.g., provide commands to, modify configurations of) any of hardware resources 150.

Hardware resources 150 may include at least hardware components 156 and channel card 154A. Hardware components 156 may include at least a display of data processing system 102 and/or one or more human interface devices (HIDs) such as a mouse, a keyboard, etc. By assuming control of the display, management controller 152 may present one or more graphical user interfaces (GUIs) to the user via the display, the user being able to interact with the GUIs using the one or more HIDs. By assuming control over the HIDs, management controller 152 may obtain user input provided via the HIDs and/or the GUIs.

At interaction 242, a request for user input may be provided to hardware components 156 by management controller 152. The request for user input may include instructions for generating and presenting a GUI to the user, the GUI including selectable options regarding whether channel card 154A is to be converted to a standard channel card. For example, the GUI may present an identifier for channel card 154A, a rationale for converting channel card 154A to a standard channel card (e.g., to improve performance and/or availability of support for channel card 154A), and selectable icons (e.g., yes, no) to collect the user input.

For example, the request for the user input may be generated and provided to hardware components 156 via (i) transmission via a message (e.g., via a sideband channel similar to sideband channels 174 described in FIG. 1B), (ii) storing in a storage with subsequent retrieval by hardware components 156, (iii) via a publish-subscribe system where hardware components 156 subscribes to updates from management controller 152 thereby causing a copy of the request for user input to be propagated to hardware components 156, and/or via other processes. By providing the request for user input to hardware components 156, hardware components 156 may provide GUI display and HID feedback collection services.

At interaction 244, the user input may be provided to management controller 152 by hardware components 156. For example, the user input may be collected and provided to management controller 152 via (i) transmission via a message (e.g., via a sideband channel similar to sideband channels 174 described in FIG. 1B), (ii) storing in a storage with subsequent retrieval by management controller 152, (iii) via a publish-subscribe system where management controller 152 subscribes to updates from hardware components 156 thereby causing a copy of the user input to be propagated to management controller 152, and/or via other processes. The user input may include a data structure indicating selections chosen by the user via an interaction with the GUI presented to the user and/or via the user's interaction with the HIDs. By providing the user input to management controller 152, management controller 152 may provide channel card conversion services.

Following receipt of the user input at interaction 244 and during user input analysis process 240, management controller 152 may read the user selections included in the user input and may determine, based on the user input, whether channel card 154 is to be converted from a non-standard channel card to a standard channel card.

For example, if the user input indicates that the user does not approve a conversion of channel card 154A to a standard channel card, management controller 152 may perform any portion of the processes and/or interactions described in FIG. 2B to typify and assign a level of trust for channel card 154A (the processes and/or interactions described in FIG. 2B may also have been previously performed for channel card 154A). In addition, if channel card 154A is not converted to a standard channel card, an operating system of the data processing system may monitor interactions between channel card 154A and other hardware components of hardware resources 150 via processes and interactions similar to those described in FIG. 2A.

In FIG. 2C, the user input may indicate that the user approves a conversion of channel card 154A to a standard channel card and, therefore, management controller 152 may proceed to interact with remote server 104 to obtain a certificate for the standard channel card.

To obtain the certificate for the standard channel card, management controller 152 may perform certificate retrieval process 246. The certificate for the standard channel card may include a cryptographically verifiable data structure delegating a right to user firmware associated with the standard channel card to the user. The certificate may include, for example, a statement indicating that the user has an active license to use the firmware for the standard channel card and the certificate may be signed using a private key of a public private key pair kept secret by remote server 104 and/or the manufacturer of the data processing system. Therefore, the certificate may be cryptographically verifiable via use of a public key of the public private key pair to verify that the certificate was signed using the private key of the public private key pair.

The firmware associated with the standard channel card may be usable to activate the standard functions. However, the firmware associated with the standard channel card may not be usable to activate any non-standard functions of the channel card 154A. During certificate retrieval process 246, at least interactions 248 and 250 may occur.

At interaction 248, a request may be provided to remote server 104 by management controller 152 via an out-of-band communication channel (e.g., similar to channel 172 described in FIG. 1B). Remote server 104 may be any remote system (e.g., a vendor and/or manufacturer of the data processing system, a certificate authority responsible for generating and/or managing certificates for firmware). The request may include an identifier for channel card 154A, an identifier for the user, instructions for remote server 104 to verify firmware that the user is authorized to use, and/or other information.

For example, the request may be generated and provided to remote server 104 via (i) transmission via a message, (ii) storing in a storage with subsequent retrieval by remote server 104, (iii) via a publish-subscribe system where remote server 104 subscribes to updates from management controller 152 thereby causing a copy of the request to be propagated to remote server 104, and/or via other processes.

Following receipt of the request by remote server 104, remote server 104 may determine whether the user (e.g., via the identifier for the user) has a right to use the firmware for the standard channel card that was requested by the request. To do so, remote server 104 may search an internal (and/or remote) database for a record of the user having purchased and/or subscribed thereby having an active license for the firmware for the standard channel card. If the user does not have a right to use the firmware for the standard channel card, remote server 104 may interact with management controller 152 to determine whether the user wishes to obtain the right to use the firmware for the standard channel card. Doing so may include interactions similar to those described with respect to user input analysis process 240 (e.g., presenting a GUI to the user, obtaining user input via the GUI and/or via any number of HIDs).

If remote server 104 identifies that the user has the right to use the firmware for the standard channel card (e.g., the user is listed as an authorized user of the firmware for the standard channel card), remote server 104 may provide the certificate to management controller 152 at interaction 250 via the out-of-band channel. Remote server 104 may generate the certificate and/or may retrieve a previously generated certificate from storage. For example, the certificate may be generated and provided to management controller 152 via (i) transmission via a message, (ii) storing in a storage with subsequent retrieval by management controller 152, (iii) via a publish-subscribe system where management controller 152 subscribes to updates from remote server 104 thereby causing a copy of the certificate to be propagated to management controller 152, and/or via other processes. By providing the certificate to management controller 152, management controller 152 may store a copy of the certificate and may use the certificate to approve performance of a conversion process for channel card 154 to obtain a converted channel card.

Following obtaining the certificate and to convert channel card 154 to a standard channel card, management controller may provide conversion instructions to channel card 154A at interaction 254. The conversion instructions may include: (i) instructions to delete existing firmware of channel card 154A, (ii) instructions for installing a copy of the firmware for the standard functions (e.g., along with executable code for installing the firmware for the standard functions), and/or (iii) other instructions.

For example, the conversion instructions may be generated and provided to channel card 154A via (i) transmission via a message, (ii) storing in a storage with subsequent retrieval by channel card 154A, (iii) via a publish-subscribe system where channel card 154A subscribes to updates from management controller 152 thereby causing a copy of the conversion instructions to be propagated to channel card 154A, and/or via other processes. By providing the conversion instructions to channel card 154A, channel card 154A may perform at least a portion of an action set to convert the non-standard channel card to the standard channel card.

For example, to convert channel card 154A to the standard channel card, channel card 154A may perform conversion process 252. During conversion process 252, channel card 154A may: (i) obtain a copy of the firmware for the standard channel card and/or instructions for installing the firmware for the standard channel card, (ii) delete existing firmware and replace the existing firmware with the firmware for the standard channel card, and/or (iii) perform other actions.

Following conversion process 252, management controller 152 may: (i) modify a level of trust for channel card 154A, (ii) delete and/or archive software and/or data structures previously used to manage functions of channel card 154A, (iii) perform additional actions to prevent future instances of activation of non-standard features of channel card 154A (not shown), and/or (iv) perform other actions. To prevent future instances of activation of the non-standard features of channel card 154A, management controller 152 may monitor (e.g., continuously, at regular intervals) firmware installed on channel card 154A and may take action to remove any firmware that is not the firmware for the standard functions.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

By converting channel card 154A to a standard channel card, channel card 154A may become a converted channel card. The converted channel card may perform the standard functions based on a class of the converted channel card and, therefore, may not be subject to (and/or may be subject to a reduced degree) limitations on interactions with other hardware components of hardware resources 150. In addition, a manufacturer of the data processing system may offer the user an increased level of technical support for the converted channel card. Consequently, a quality and/or reliability of the computer-implemented services provided, at least in part, using the converted channel card may be increased for the user.

Figure 3A:
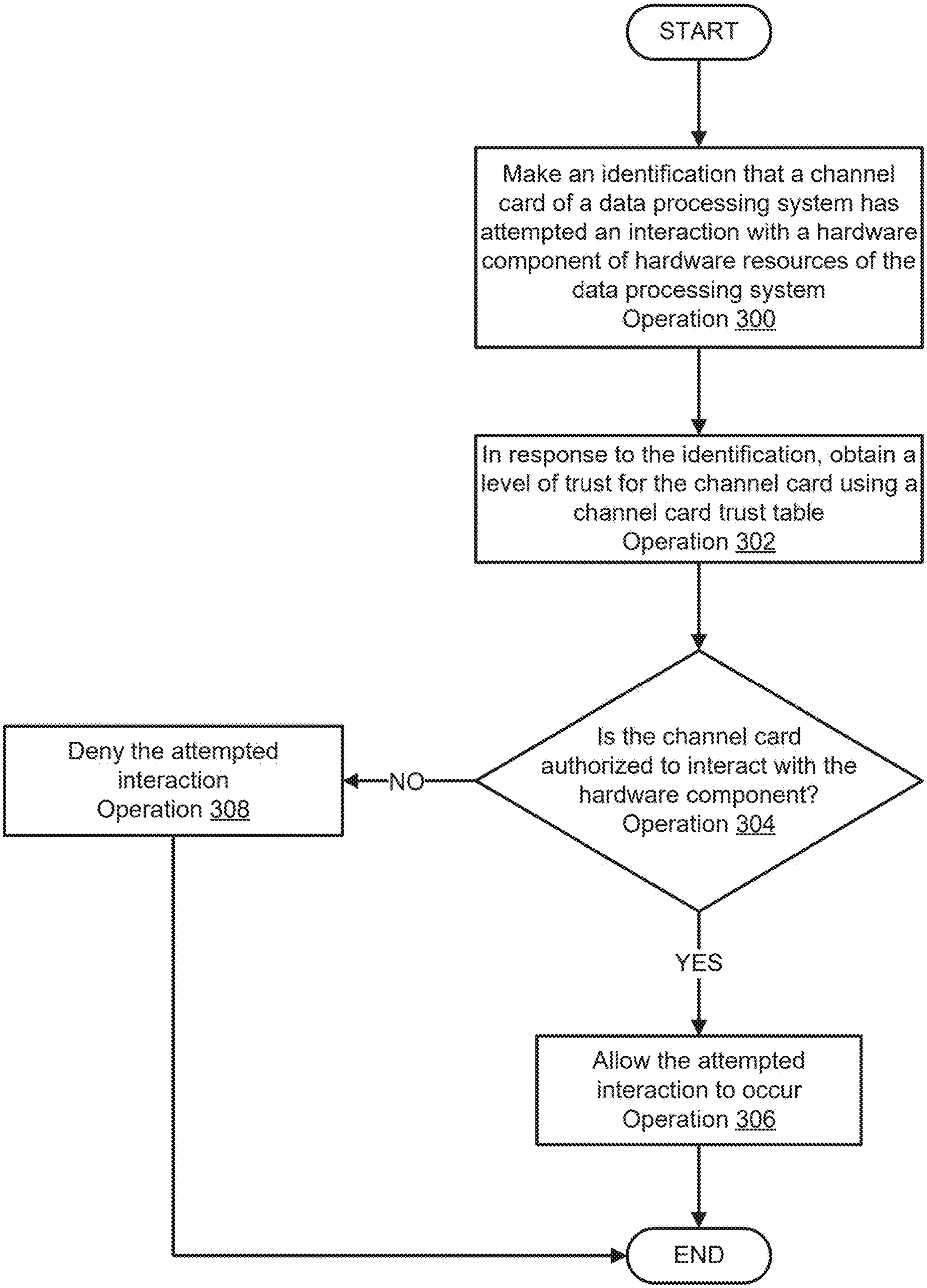
FIGS. 3A-3C show flow diagrams illustrating methods in accordance with an embodiment.
Figure 3B:
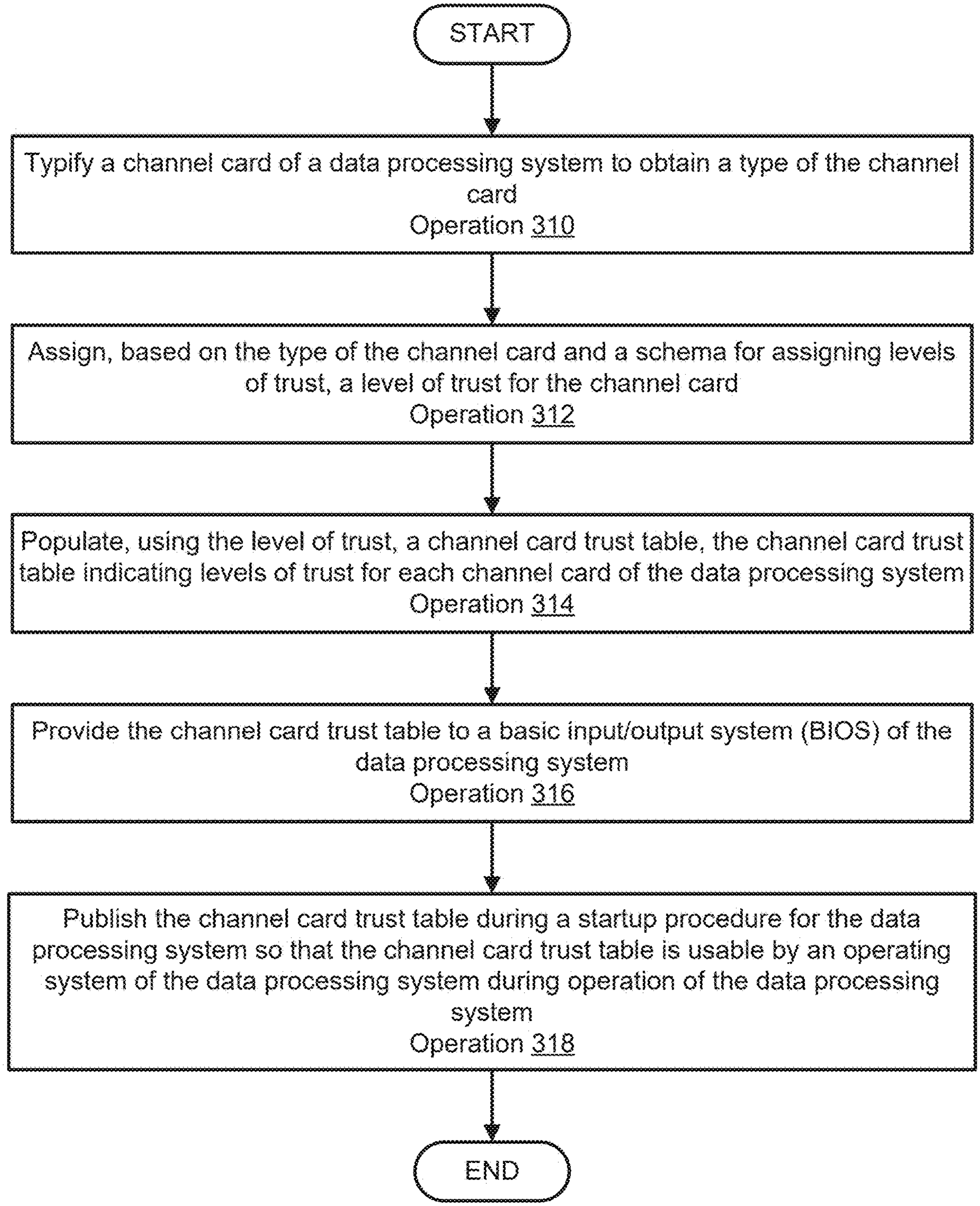

As discussed above, the components of FIGS. 1A-1B may perform various methods to manage operation of a data processing system. FIGS. 3A-3B illustrate methods that may be performed by the components of FIGS. 1A-1B. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method in accordance with an embodiment is shown. The flow diagram may illustrate various operations performed while managing interactions between channel cards and hardware components of hardware resources of the data processing system. The data processing system may include hardware resources (including any number of channel cards) and a management controller, and may be similar to the data processing system discussed with respect to FIGS. 1A-1B.

At operation 300, an identification may be made that a channel card of a data processing system has (and/or is in the process of and/or may in the future) attempted an interaction with a hardware component of hardware resources of the data processing system. Making the identification may include: (i) snooping communication channels (e.g., in-band channels) of the data processing system and identifying attempted communications traversing the communication channels from the channel cards, (ii) intercepting the attempted communications, and/or (iii) other methods. The intercepted communications may include an identifier for the channel card that provided the communication, an identifier for the hardware component (e.g., the intended recipient), and/or other information.

At operation 302, a level of trust for the channel card may be obtained using a channel card trust table and in response to the identification. Obtaining the level of trust may include: (i) obtaining an identifier for the channel card attempting to communicate with the hardware component (e.g., from the intercepted communication), (ii) performing a lookup process using the identifier for the channel card as a key for the channel card trust table (e.g., a lookup table), and/or (iii) obtaining, as a result of the lookup process and from the channel card trust table, a level of trust that corresponds to the identifier for the channel card.

At operation 304, it may be determined whether the channel card is authorized to interact with the hardware component based on the level of trust. Making the determination may include: (i) obtaining a definition for the level of trust (e.g., a list of authorized actions, a list of hardware components authorized for access) from the channel card trust table and/or from storage, (ii) comparing the identifier for the intended recipient of the attempted communication (e.g., the hardware component) to the definition of the level of trust to determine whether the hardware component is an authorized hardware component, and/or (iii) other methods. Making the determination may also include providing the level of trust to another entity responsible for consulting the definition of the level of trust.

If the channel card is authorized to interact with the hardware component, the method may proceed to operation 306.

At operation 306, the attempted interaction may be allowed to occur. Allowing the attempted interaction to occur may include: (i) allowing the attempted communication to reach the hardware component (e.g., forwarding the attempted communication, releasing a hold on the attempted communication, etc.), (ii) notifying the channel card that the attempted communication is authorized, (iii) notifying the hardware component that the communication is authorized, and/or (iv) other methods.

The method may end following operation 306.

Returning to operation 304, the method may proceed to operation 308 if the channel card is not authorized to interact with the hardware component.

At operation 308, the attempted interaction may be denied. Denying the attempted interaction may include: (i) deleting and/or returning the attempted communication thereby disallowing the attempted communication to reach the hardware component, (ii) notifying the channel card that the attempted communication is not authorized, (iii) writing a log entry related to the attempted communication in storage, and/or (iv) other methods.

While described with respect to active interception, it will be appreciated that proactive prevention of attempts to interact may be used. For example, device visibility to a channel card may be proactively limited based on the level of trust for the channel card. In this manner, the attempts to interact may be proactively limited by prevent the channel card from being aware of the existence some other hardware components.

The method may end following operation 308.

The attempted interaction may facilitate provisioning of a computer-implemented service when authorized and, therefore, monitoring attempted communications from channel cards to hardware components may increase a likelihood of providing the computer-implemented service as desired. By denying interactions that are not authorized, potentially compromised channel cards may have a reduced likelihood of compromising hardware components of the data processing system thereby increasing a quality and/or reliability of the computer-implemented services provided.

Turning to FIG. 3B, a second flow diagram illustrating a method in accordance with an embodiment is shown. The second flow diagram may illustrate various operations performed while assigning levels of trust for channel cards of a data processing system. The data processing system may include hardware resources (including any number of channel cards) and a management controller, and may be similar to the data processing system discussed with respect to FIGS. 1A-1B.

At operation 310, a channel card of the data processing system may be typified to obtain a type of the channel card. Typifying the channel card may include: (i) obtaining identifying information for the channel card (e.g., a manufacturer, a serial number) from the channel card and/or from another entity, (ii) comparing the identifying information to a schema for assigning types of channel cards, (iii) obtaining, using the schema, the type of the channel card, and/or (iv) other methods.

At operation 312, a level of trust for the channel card may be assigned based on the type of the channel card and a schema for assigning levels of trust. Assigning the level of trust may include performing a lookup process using the type of the channel card as a key for a level of trust lookup table (e.g., indicated by the schema) and obtaining the level of trust as a result of the lookup process and/or other methods. Refer to FIG. 2B for additional details regarding identifying types of channel cards and assigning levels of trust based on the types of the channel cards.

At operation 314, a channel card trust table may be populated using the level of trust. The channel card trust table may indicate levels of trust for each channel card of the data processing system. Populating the channel card trust table may include: (i) adding (e.g., writing) an identifier for the channel card and the level of trust for the channel card to the channel card trust table, (ii) providing the identifier for the channel card and the level of trust to another entity responsible for modifying the channel card trust table, and/or (iii) other methods.

At operation 316, the channel card trust table may be provided to a BIOS of the data processing system. Providing the channel card trust table to the BIOS may include: (i) encapsulating the channel card trust table in a message, (ii) transmitting the message across a sideband channel of the data processing system to the BIOS, (iii) storing the channel card trust table in storage and providing the BIOS with instructions to retrieve the channel card trust table, and/or (iv) other methods.

At operation 318, the channel card trust table may be published during a startup procedure for the data processing system so that the channel card trust table is usable by an operating system of the data processing system during operation of the data processing system. Publishing the channel card trust table may include: (i) storing the channel card trust table in a storage architecture accessible by the operating system but not editable by the operating system, (ii) notifying the operating system that the channel card trust table is available (e.g., providing instructions for the operating system to utilize the channel card trust table to manage interactions between channel cards and hardware components), (iii) initiating the startup procedure for the data processing system, and/or (iv) other methods.

The method may end following operation 318.

Thus, channel cards added to the data processing system may be identified and levels of trust may be assigned prior to allowing the channel cards to access hardware resources during operation of the data processing system. By doing so, potentially compromised channel cards may have a reduced likelihood of compromising the hardware components and the computer-implemented services provided by the hardware resources may have an increased likelihood of being provided as desired.

Figure 3C:
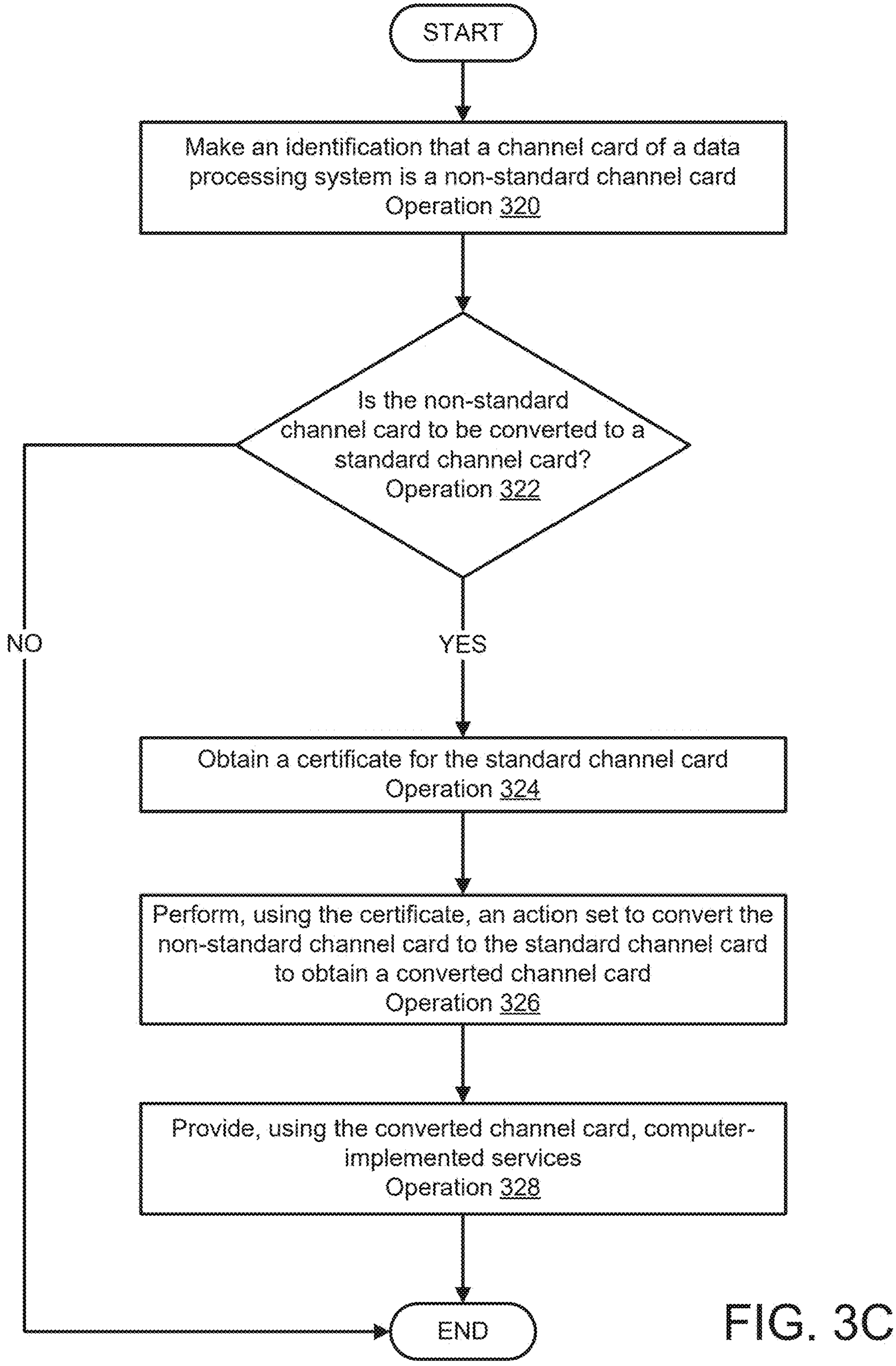

Turning to FIG. 3C, a third flow diagram illustrating a method in accordance with an embodiment is shown. The third flow diagram may illustrate various operations performed while converting a non-standard channel card to a standard channel card. The data processing system may include hardware resources (including any number of channel cards) and a management controller, and may be similar to the data processing system discussed with respect to FIGS. 1A-1B.

At operation 320, an identification may be made that a channel card of a data processing system is a non-standard channel card. Making the identification may include: (i) determining, during a startup procedure for the data processing system, that a new hardware component has been operably connected to the data processing system (e.g., during a secured component verification process and/or via receiving a notification from a startup management entity), (ii) obtaining a list of functions of the channel card (e.g., requesting the list of functions from the channel card, querying another entity for the list of the functions by retrieving a serial number for the channel card and providing the serial number to the entity, (iii) comparing the list of functions to a list of standard functions based on a class of the channel card (e.g., based on an industry standard), (iii) if any functions of the list of functions do not match the list of standard functions, concluding that the channel card is the non-standard channel card, and/or (iv) other methods.

At operation 322, it may be determined whether the non-standard channel card is to be converted to a standard channel card. Determining whether the non-standard channel card is to be converted to the standard channel card may include: (i) assuming control over a display and one or more HIDs of the data processing system, (ii) presenting, using at least the display, information to the user, (iii) obtaining, via at least the HIDs, user input, (iv) reading the user input to identify an intent of the user, and/or (v) other methods.

Assuming control over the display and the one or more HIDs may include providing instructions (e.g., via a sideband channel) to the display and the one or more HIDs indicating actions to be performed by the display and/or the one or more HIDs. The instructions may indicate contents of a GUI to be displayed, options to be presented to the user, and/or informational content of text to be displayed to the user via the display. Assuming control over the display and the one or more HIDs may also include modifying one or more configuration of the display and/or the one or more HIDs to modify operation of the display and/or the HIDs.

Presenting the information to the user may include: (i) generating and displaying a GUI to the user via the display, (ii) generating human readable text that is to be displayed by the display, (iii) providing instructions to another entity responsible for managing the display and/or the contents of the GUI, and/or (iv) other methods. The GUI may present information to the user regarding conversion of the non-standard channel card to the standard channel card and may present selectable options (e.g., yes, no) with which the user may interact via use of the one or more HIDs.

Obtaining the user input may include: (i) tracking one or more actions performed by the user via the one or more HIDs (e.g., keystrokes on a keyboard, movements of a mouse, icons clicked by a mouse), (ii) aggregating data based on the actions performed by the user, the data being interpretable to indicate an intent of the user, and/or (iii) other methods.

If the user input indicates that the user approves conversion of the channel card, the method may proceed to operation 324. If the user input indicates that the user does not approve conversion of the channel card, the method may end following operation 322.

At operation 324, a certificate for the standard channel card may be obtained. Obtaining the certificate may include: (i) reading the certificate from storage, (ii) receiving the certificate in the form of a message (e.g., from a remote server and via an out-of-band communication channel), (iii) generating the certificate, and/or (iv) other methods.

At operation 326, an action set may be performed, using the certificate, to convert the non-standard channel card to the standard channel card to obtain a converted channel card. Performing the action set may include: (i) replacing firmware associated with the non-standard channel card with the firmware associated with the standard channel card, (ii) modifying configurations of the channel card, (iii) preventing future instances of activation of at least one non-standard feature of the channel card, (iv) modifying management instructions for the channel card for the operating system, management entities, and/or other hardware components, and/or (v) other methods.

Replacing the firmware may include: (i) deleting existing firmware for the channel card, (ii) obtaining executable instructions usable to install the firmware for the standard channel card, (iii) installing the firmware for the standard channel card using the executable instructions, (iv) providing instructions for installing the firmware for the standard channel card to another entity responsible for modifying firmware for the channel card, and/or (v) other methods.

Preventing future instances of activation of the non-standard features of the channel card may include: (i) monitoring (e.g., continuously, at regular intervals) firmware installed on the channel card and identifying any firmware that is not the firmware for the standard channel card, (ii) obtaining (e.g., installing) a software agent responsible for interacting with an operating system of the data processing system to monitor all firmware and/or software applications that may modify functionality of the channel card, and/or (iii) deleting any firmware that is not the firmware for the standard channel card and that may re-activate the non-standard features of the channel card.

Modifying management instructions for the channel card may include: (i) modifying a level of trust for the channel card, (ii) removing restrictions on interactions between the channel card and other hardware components, and/or (iii) other methods.

At operation 328, computer-implemented services may be provided using the converted channel card. Providing the computer-implemented services may include performing the standard functions of the converted channel card during operation of the data processing system and/or other methods. For example, the channel card may: (i) interact with other hardware components, (ii) provide and/or receive commands during interactions with the other hardware components, and/or (iii) execute instructions included in the commands to provide, at least in part, the computer-implemented services to the user.

The method may end following operation 328.

Thus, channel cards added to the data processing system may be identified and if any of the channel cards are non-standard channel cards, user input may be obtained regarding whether the non-standard channel cards are to be converted to channel cards. By converting non-standard channel cards to standard channel cards, limitations on interactions between the non-standard channel cards and other hardware components may be reduced. Consequently, the standard functions of the converted channel card may be more likely to be provided to the user as desired while maintaining security for the data processing system.

Figure 4:
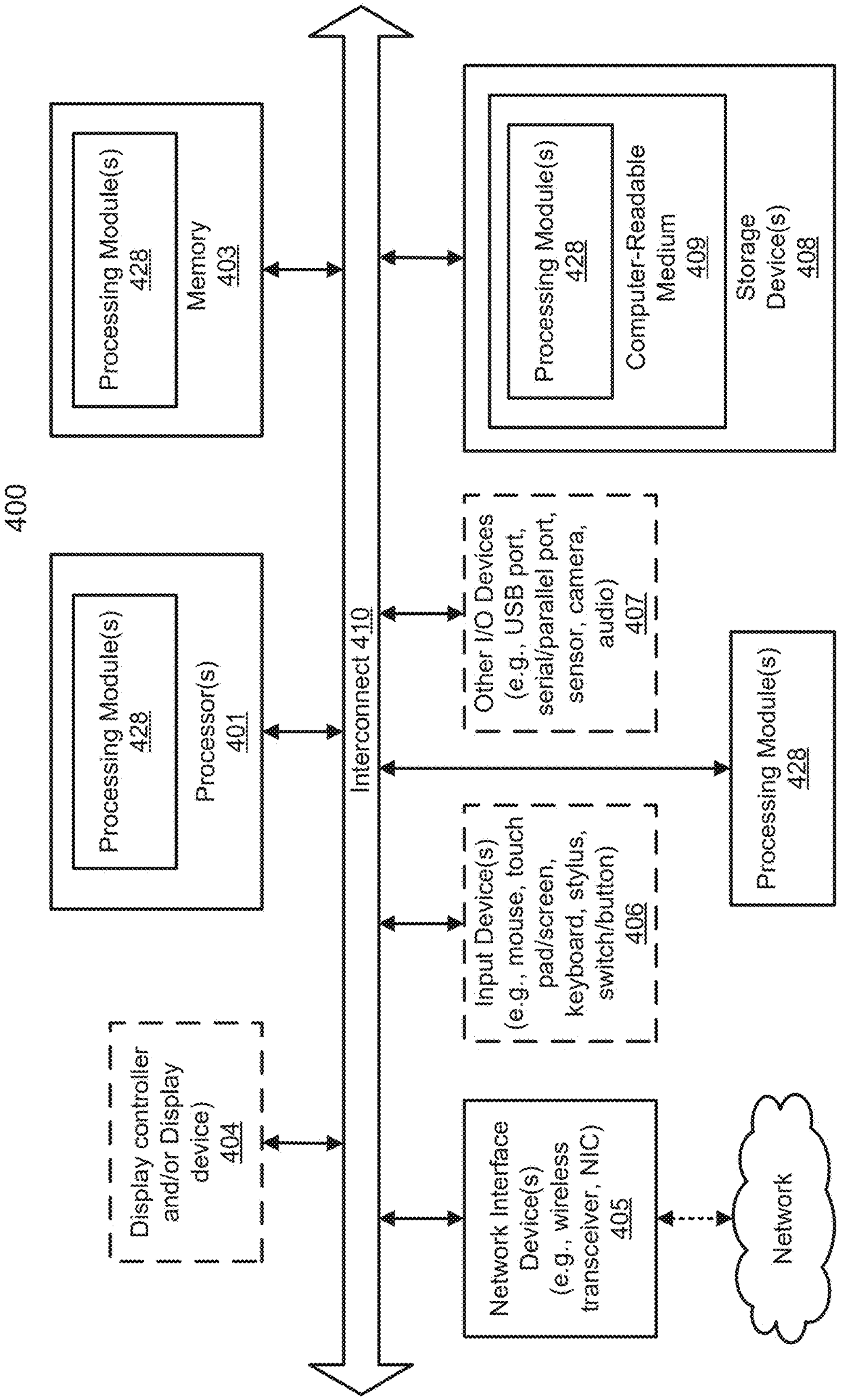
FIG. 4 shows a block diagram illustrating a data processing system in accordance with an embodiment.

Any of the components illustrated in FIGS. 1A-3C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., basic input/output system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output system (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

making an identification that a channel card of the data processing system is a non-standard channel card;

based on the identification:

making a determination, by a management controller of the data processing system and based on user input from a user, regarding whether the non-standard channel card is to be converted to a standard channel card;

in an instance of the determination in which the non-standard channel card is to be converted to the standard channel card:

obtaining, by the management controller and via an out-of-band communication channel, a certificate for the standard channel card from a remote server;

performing, using the certificate, an action set to convert the non-standard channel card to the standard channel card to obtain a converted channel card; and providing, using the converted channel card, computer-implemented services, wherein the data processing system comprises a network module adapted to separately advertise network endpoints for the management controller and hardware resources of the data processing system, the network endpoints being usable by the remote server to address communications to the hardware resources using an in-band communication channel and the management controller using the out-of-band communication channel.

2. The method of claim 1, wherein the non-standard channel card is configured to perform at least one non-standard function based on standard functions of a class of the channel card and the non-standard channel card has a first level of trust for accessing the hardware resources of the data processing system.

3. The method of claim 2, wherein the standard channel card is configured to perform the standard functions and not the at least one non-standard function and the standard channel card has a second level of trust for accessing the hardware resources.

4. The method of claim 3, wherein the second level of trust is associated with a higher degree of authority for activating functions of the hardware resources than a degree of authority for activation functions of the hardware resources associated with the first level of trust.

5. The method of claim 1, wherein the identification is made by a basic input/output system (BIOS) of the data processing system during a startup procedure for the data processing system.

6. The method of claim 1, wherein making the determination comprises:

assuming, by the management controller, control over a display and one or more human interface devices (HIDs) of the data processing system;

presenting, by the management controller and using at least the display, information to the user; and obtaining, by the management controller and via at least the one or more HIDs, the user input.

7. The method of claim 2, wherein the certificate comprises a cryptographically verifiable data structure delegating a right to use firmware associated with the standard channel card to the user, the firmware associated with the standard channel card being usable to activate the standard functions.

8. The method of claim 7, wherein performing the action set comprises:

replacing firmware associated with the non-standard channel card with the firmware associated with the standard channel card, the firmware associated with the non-standard channel card being usable to activate the at least one non-standard function.

9. The method of claim 8, wherein performing the action set further comprises:

preventing, by the management controller, future instances of activation of the at least one non-standard function.

10. The method of claim 1, wherein the management controller is separate from and tasked with managing operation of the hardware resources of the data processing system, the hardware resources comprising the channel card.

11. The method of claim 1, wherein the management controller and the network module are on separate power domains from the hardware resources so that the management controller and the network module are operable while the hardware resources are inoperable.

12. The method of claim 1, wherein the out-of-band communication channel runs through the network module, and the in-band communication channel that services the hardware resources also runs through the network module.

13. The method of claim 1, wherein the network module hosts a transmission control protocol/internet protocol (TCP/IP) stack to facilitate network communications via the out-of-band communication channel.

14. A non-transitory machine-readable medium having instructions stored therein, which when executed by a management controller of a data processing system, cause the management controller to perform operations for managing operation of the data processing system, the operations comprising:

making an identification that a channel card of the data processing system is a non-standard channel card;

based on the identification:

making a determination, by the management controller of the data processing system and based on user input from a user, regarding whether the non-standard channel card is to be converted to a standard channel card;

in an instance of the determination in which the non-standard channel card is to be converted to the standard channel card:

obtaining, by the management controller and via an out-of-band communication channel, a certificate for the standard channel card from a remote server;

performing, using the certificate, an action set to convert the non-standard channel card to the standard channel card to obtain a converted channel card; and providing, using the converted channel card, computer-implemented services, wherein the data processing system comprises a network module adapted to separately advertise network endpoints for the management controller and hardware resources of the data processing system, the network endpoints being usable by the remote server to address communications to the hardware resources using an in-band communication channel and the management controller using the out-of-band communication channel.

15. The non-transitory machine-readable medium of claim 14, wherein the non-standard channel card is configured to perform at least one non-standard function based on standard functions of a class of the channel card and the non-standard channel card has a first level of trust for accessing the hardware resources of the data processing system.

16. The non-transitory machine-readable medium of claim 15, wherein the standard channel card is configured to perform the standard functions and not the at least one non-standard function and the standard channel card has a second level of trust for accessing the hardware resources.

17. A data processing system, comprising:

hardware resources;

a management controller; and a memory coupled to the management controller to store instructions, which when executed by the management controller, cause the management controller to perform operations, the operations comprising:

making an identification that a channel card of the data processing system is a non-standard channel card;

based on the identification:

making a determination, by the management controller of the data processing system and based on user input from a user, regarding whether the non-standard channel card is to be converted to a standard channel card;

in an instance of the determination in which the non-standard channel card is to be converted to the standard channel card:

obtaining, by the management controller and via an out-of-band communication channel, a certificate for the standard channel card from a remote server;

performing, using the certificate, an action set to convert the non-standard channel card to the standard channel card to obtain a converted channel card; and providing, using the converted channel card, computer-implemented services, wherein the data processing system comprises a network module adapted to separately advertise network endpoints for the management controller and the hardware resources of the data processing system, the network endpoints being usable by the remote server to address communications to the hardware resources using an in-band communication channel and the management controller using the out-of-band communication channel.

18. The data processing system of claim 17, wherein the non-standard channel card is configured to perform at least one non-standard function based on standard functions of a class of the channel card and the non-standard channel card has a first level of trust for accessing the hardware resources of the data processing system.

19. The data processing system of claim 18, wherein the standard channel card is configured to perform the standard functions and not the at least one non-standard function and the standard channel card has a second level of trust for accessing the hardware resources.

20. The data processing system of claim 19, wherein the second level of trust is associated with a higher degree of authority for activating functions of the hardware resources than a degree of authority for activation functions of the hardware resources associated with the first level of trust.

* * * * *